(12) United States Patent
Greene

(10) Patent No.: US 11,159,847 B2
(45) Date of Patent: Oct. 26, 2021

(54) APPARATUS, SYSTEMS AND METHODS FOR REDUCING TIME REQUIRED FOR A MEDIA CONTENT EVENT CHANNEL CHANGE

(71) Applicant: DISH Technologies L.L.C., Englewood, CO (US)

(72) Inventor: Gregory Greene, Littleton, CO (US)

(73) Assignee: DISH Technologies L.L.C., Englewood, CO (US)

( * ) Notice: Subject to any disclaimer, the term of this patent is extended or adjusted under 35 U.S.C. 154(b) by 821 days.

(21) Appl. No.: 15/273,278

(22) Filed: Sep. 22, 2016

(65) Prior Publication Data

US 2018/0084300 A1    Mar. 22, 2018

(51) Int. Cl.

| | |
|---|---|
| H04N 21/2362 | (2011.01) |
| H04N 21/235 | (2011.01) |
| H04N 21/438 | (2011.01) |
| H04N 21/442 | (2011.01) |
| H04N 21/482 | (2011.01) |
| H04N 21/472 | (2011.01) |
| H04N 21/6332 | (2011.01) |
| H04N 21/6336 | (2011.01) |
| H04N 21/434 | (2011.01) |

(52) U.S. Cl.
CPC ..... *H04N 21/4384* (2013.01); *H04N 21/2362* (2013.01); *H04N 21/4345* (2013.01); *H04N 21/44209* (2013.01); *H04N 21/472* (2013.01); *H04N 21/482* (2013.01); *H04N 21/6332* (2013.01); *H04N 21/6336* (2013.01)

(58) Field of Classification Search
CPC .......................... H04N 21/234; H04N 21/235
USPC ..................................... 725/74–104
See application file for complete search history.

(56) References Cited

U.S. PATENT DOCUMENTS

| 6,751,713 B1 * | 6/2004 | Guo | H04N 5/4401 |
| | | | 348/E5.097 |
| 2004/0181813 A1 * | 9/2004 | Ota | H04N 5/4401 |
| | | | 725/131 |
| 2006/0126597 A1 * | 6/2006 | Chae | H04N 5/44543 |
| | | | 370/352 |
| 2007/0076716 A1 * | 4/2007 | Jang | H04N 21/2362 |
| | | | 370/390 |

(Continued)

*Primary Examiner* — Mushfikh I Alam
(74) *Attorney, Agent, or Firm* — Kilpatrick Townsend & Stockton LLP

(57) ABSTRACT

Systems and methods of a media device are operable to perform a channel change operation. An exemplary embodiment receives a first data table from a data table server, wherein the first data table comprises first control information used to perform a channel change operation such that the media device reconfigures itself to change to a new channel from a currently presenting channel or to a new media content event from a currently presenting media content event. The exemplary embodiment later receives a second data table after initiation of the channel change operation, wherein the second data table is broadcast to the media device in one of a plurality of received broadcasting media content streams that has the new media content event, and wherein the second data table comprises second control information that corresponds to at least some of the first control information used to perform the channel change operation.

18 Claims, 2 Drawing Sheets

(56) References Cited

U.S. PATENT DOCUMENTS

| | | | | |
|---|---|---|---|---|
| 2007/0118866 A1* | 5/2007 | Chen | ............... | H04N 5/44591 |
| | | | | 725/87 |
| 2008/0201732 A1* | 8/2008 | Kwon | ............... | H04N 7/52 |
| | | | | 725/31 |
| 2009/0106803 A1* | 4/2009 | Chen | ............... | H04N 21/2387 |
| | | | | 725/103 |
| 2009/0217339 A1* | 8/2009 | Kim | ............... | H04N 21/4263 |
| | | | | 725/131 |
| 2009/0293083 A1* | 11/2009 | Gordon | ............... | H04N 7/162 |
| | | | | 725/25 |
| 2011/0110313 A1* | 5/2011 | Eu | ............... | H04W 24/00 |
| | | | | 370/329 |
| 2015/0101001 A1* | 4/2015 | Kang | ............... | H04N 21/4263 |
| | | | | 725/116 |
| 2016/0277545 A1* | 9/2016 | Kwak | ............... | H04L 1/0042 |

* cited by examiner

APPARATUS, SYSTEMS AND METHODS FOR REDUCING TIME REQUIRED FOR A MEDIA CONTENT EVENT CHANNEL CHANGE

BACKGROUND

Media devices, such as a set top box, television or the like, are often configured to receive a plurality of streams of broadcasting media content over a broadcast communication system. Each broadcasting stream of media content (interchangeably referred to herein as a media content stream) may include a time-sequenced series of streaming media content events. Typically, a media content event presents theme-based visual and audio content to a user for their enjoyment and/or for informative purposes. Examples of such theme-based content includes movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically. Advertisements, commercials or the like may be interspersed within the media content event.

In a media content broadcast environment, at any given instant in time, a media device may be receiving hundreds of, or even thousands of, concurrently broadcasting media content streams. In some types of media content broadcast environments, each media content stream may have one or more streaming media content events being transported therein. When a user of the media device wishes to view and or listen to a media content event (interchangeably referred to herein as a presentation of a media content event), the user specifies a suitable identifier to the media device that indicates which one of the many available streaming media content events that they wish to view. Then, the media device operates its various components to receive, to process, and then to communicate the media content event of interest to the user for presentation on a media presentation system.

Typically, presentation of a media content event occurs over some time span (duration). Thus, the media content event of interest to the user has a broadcast start time that presents a beginning portion which usually includes identifying information about the media content event, such as music, text of a title, or other information. When the user views this beginning portion of the media content event, the user intuitively understands that they are viewing the beginning of the media content event.

As time progresses, the entirety of the streaming media content event of interest is presented to the user as the stream of media content is being received in the media content stream. At some point, the media content event of interest comes to its end (conclusion), its broadcast end time. A viewing user intuitively understands that the media content event of interest is ending upon viewing a concluding portion of the media content event that is presented prior to the broadcast end time. Such concluding portions of the media content event typically include the closing credits portion, wherein the closing credits is visible to the user. Typically, when the user is viewing a live broadcast of the media content event, a next media content event begins after the conclusion of the media content event of interest. Alternatively, one or more commercials or the like may next be presented to the user prior to the initial presentation of the next live broadcast media content event (assuming that the user chooses to view that next media content event).

In a digital-based media content broadcast environment, each media content event is streamed to the media device via a suitable transport channel that is being broadcast from a broadcasting media content facility. Each media content event is packetized into discrete data packets. Each data packet has a small portion of the video, audio and other information (interchangeably referred to herein as a content portion). The data packets are then inserted serially in a predefined sequence into the transport stream (thus forming the above-described media content stream), and are then broadcast from a media content broadcast facility out to a plurality of media devices. In some applications, each media content event that is being concurrently broadcast will be transported in its own media content stream. Alternatively, or additionally, the data packets of multiple media content events may be interleaved together for transport in a single media content stream.

When the series of data packets are received at an individual media device, the media device processes the received data packets associated with a particular media content event of interest as the stream of data packets are being received at the media device. Each data packet is uniquely identified by an identifier. The packet also has information identifying the particular media content event and a presentation time indicating when that portion of the content portion is to be presented relative to the other content portions.

Accordingly, a first process performed by the receiving media device is to operate itself to receive as an input the particular media content stream 108 that contains the media content event of interest that has been requested the user. Other media content streams 108 having other media content events therein are not processed. (This first process performed by the media device is interchangeably referred to as "tuning" herein.)

Once the tuning process has been completed such that the media device is now accessing the particular media content stream 108 containing the media content event of interest to the user, the media device then retrieves the serial stream of arriving data packets (each having a small content portion of the video, audio and other information) containing the media content event of interest. As noted above, each of the data packets associated with the media content event of interest have an identifier that differentiates those data packets from the data packets of other media content events. Accordingly, during the process of receiving a user's request for a particular media content event of interest, the identifier that identifies the data packets is accessed at the media device.

Further, the content portion in the accessed data packets must be retrieved and processed in a particular order so that when the data is assembled into a stream of video and audio content, the small content portions of data are sequenced in the correct order so that the stream of video and audio information communicated to the media presentation system results in a presentation of the media content event of interest as intended by the producers of the media content event. Thus, each of the data packets associated with the media content event of interest have information that identifies the position of the encapsulated data with respect to the position of the content portion in the streaming media content event.

The media device then reconstructs the media content event using the content portions in the received processed data packets, and then streams the media content event to the media presentation system so that the user views the video portion of the media content event and hears the audio portion of the media content event. That is, the reconstructed video portion of the media content stream (with the media content event) is presented on a display and the audio portion is presented from one or more suitable speakers. Depending upon the particular media device, the streaming media content event is generated into a format that is suitable for presentation on a particular media presentation system.

Typically, the media device is able to receive and present a media content event that is user-selected from many hundreds, or even thousands of, concurrently broadcasting media content events being transported in one of a plurality of different media content streams. To facilitate informing the user of the particular media content events that are currently available (currently being broadcast at the same time) in the broadcasting media content streams, the media device is configured to generate and present an electronic program guide (EPG) on the display to a viewing user. The EPG is a type of a user interface that presents a menu, or a series of menus, that describe available media content events that are available for presentation. The EPG has the look and feel of a table that uses a combination of text and/or symbols to indicate the media content event viewing choices that may be selected by the user. The media content event information presented on the EPG may include the title of available program, the "channel" of the available program, the scheduled broadcast start time, the scheduled broadcast end time, the date of presentation, and optionally, some amount of supplemental information (such as a brief description of the media content event).

A "channel" as defined herein is understood by one skilled in the arts to be a physical channel or virtual channel over which media content (such as provided by a television station, a television network, or other media content provider) is broadcast to a plurality of media devices. Typically, a "channel" is associated with a unique numeric identifier and/or an alpha-numeric identifier associated with a source of the media content being broadcast on that particular channel. For example, in North America, "channel 2" refers to the over-the-air broadcast or a cable band of 54 to 60 MHz, with carrier frequencies of 55.25 MHz for NTSC analog video (VSB) and 59.75 MHz for analog audio (FM), or 55.31 MHz for digital ATSC (8VSB). The same numeric channel identifiers may be used by many different television stations or cable-distributed channels depending on the location of the receiving media devices and/or upon the particular service provider that is broadcasting the media content. Commonly, the term "channel" may be used to refer to either a terrestrial television station or its cable/satellite counterpart (both outlined below) such that a user of the media device intuitively understands information about the source of the media content that is broadcasting on that particular channel. Sometimes, especially outside the U.S. and in the context of cable/satellite media content delivery systems, a "channel" is used instead of the term television network, which otherwise (in its technical use above) describes a group of geographically-distributed television stations that share affiliation/ownership and some or all of their programming with one another.

The EPG is interactive with the user. The user, by actuating one or more of the controllers on their remote control, is able to "scroll" or "navigate" about the EPG to select a media content event of interest. Accordingly, when viewing the EPG, the user is able to select a currently received live broadcast media content event of interest for presentation.

Based on a selected media content event of interest, the information that identifies the particular media content stream 108 having the media content event of interest, and the identifiers of the data packets associated with the media content event of interest, is then determined by the media device. One skilled in the art appreciates that the process of identifying and accessing particular data packets from a particular media content stream, and then accessing the data to reconstruct the media content event of interest, is a very complex process. To ensure that the media device has the necessary information to complete the above-described process, a plurality of data tables with the required control information therein is periodically communicated to the media device in one or more of the broadcasting media content streams. Thus, when a user selects a particular media content event of interest, the media device can access the control information in the plurality of data tables so that the above-described processes can be successfully completed by the media device so that the media content event may be presented to the user.

In practice, the media device is continuously receiving and processing the data packets for a currently presenting media content event that has been previously selected by the user. Here, the requisite data residing in the previously received plurality of data tables has already been accessed such that the currently presenting media content event is being properly presented to the user. The user, at some point, may then decide that they wish to view a different media content event (which may, by coincidence, be interleaved into the media content stream 108 that is being currently received and processed, or which must be accessed from a different media content stream). The different media content event may be selected by the user via a viewed EPG. Alternatively, the user may operate a remote control or other device that changes the "channel" (typically identified by a predefined channel number) from the currently presenting media content event to a different "channel" that has the different media content event. Here, the user may simply increment or decrement the channel number to change channels, or may specify a particular channel of interest, by operating their remote control.

Regardless of how a change to a new media content event is initiated by the user, the media device must reconfigure the operation of its various components to receive and process the particular media content stream 108 that has the new user-specified media content event. For example, the media device must access the information associated with the newly selected media content event from the plurality of data tables. This information is used to identify the particular one of the plurality of media content streams containing the data packets for the new media content event of interest. Then, the media device can retune itself so as to receive and process the correct media content stream that has the data packets for the new media content event of interest. Next, the data packets have to be accessed and processed based on the information in the plurality of data tables. Finally, at some point, the newly selected media content event may begin to be streamed out to the media presentation system for presentation to the user. The various processes associated with accessing the data for a newly selected media content event of interest is generically referred to herein as a "channel change operation" or the like. To successfully implement a channel change operation, the media device must obtain all of the control information associated with the new media content event from the plurality of data tables.

The reconfiguration process to implement a channel change operation requires some amount of time (interchangeably referred to herein as a channel change duration) to complete. Often, the channel change duration is discernible to the viewing user. During the channel change duration, the media device may present a blank, colored and/or patterned image on the display to the user (since the newly selected media content event is not immediately available for presentation). Presentation of the new media content event can begin after the media device has completed the channel change operation, and after the media device has then processed enough of the received data packets so as to have a sufficient amount of video and audio content to initiate presentation of the new media content event.

In legacy media devices, the channel change duration may be of a relatively long duration, on the order of a fraction of a second (or at most a few seconds). Typically, a user perceiving the channel change duration may become distracted, and may find that the delay until presentation of the newly selected media content event is unsatisfying. Accordingly, there is a need in the arts to reduce the amount of time associated with the channel change duration to improve the user's enjoyment of their viewing experience.

SUMMARY

Systems and methods of performing a channel change operation at a media device are disclosed. An exemplary embodiment receives a first data table from a data table server, wherein the first data table comprises first control information used to perform a channel change operation such that the media device reconfigures itself to change to a new channel from a currently presenting channel or to a new media content event from a currently presenting media content event. The exemplary embodiment later receives a second data table after initiation of the channel change operation, wherein the second data table is broadcast to the media device in one of a plurality of received broadcasting media content streams that has the new media content event, and wherein the second data table comprises second control information that corresponds to at least some of the first control information used to perform the channel change operation.

BRIEF DESCRIPTION OF THE DRAWINGS

Preferred and alternative embodiments are described in detail below with reference to the following drawings.

DETAILED DESCRIPTION

Figure 1:
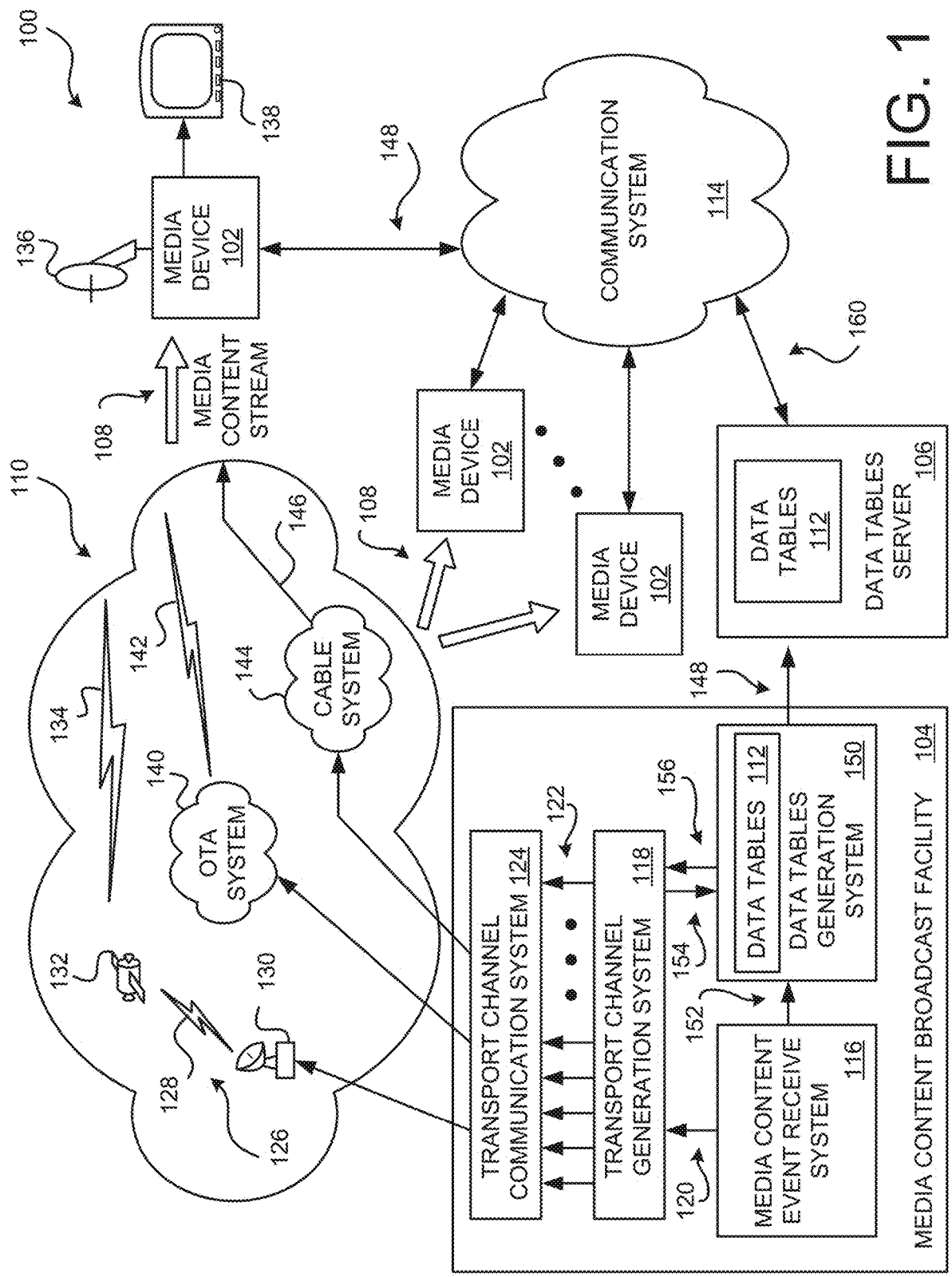
FIG. 1 is a block diagram of an embodiment of a fast channel change system implemented in media content broadcast environment that includes a plurality of media devices, a media content broadcast facility, and a data tables server.

FIG. 1 is a block diagram of an embodiment of a fast channel change system 100 implemented in media content broadcast environment that includes a plurality of media devices 102, a media content broadcast facility 104, and a data tables server 106. Embodiments of the fast channel change system 100 are operable to implement a channel change operation (from a currently presenting media content event of a currently received channel to a new media content event being received on a different channel) that requires a smaller channel change duration than legacy media content broadcast systems. An exemplary media device 102 includes a set top box (STB). Embodiments of the fast channel change system 100 may be implemented in other types of media devices 102.

The media devices 102 are configured to receive a plurality of broadcasting media content streams 108 of media content that are being broadcast out from the media content broadcast facility 104 via a broadcast communication system 110. One or more of the broadcasting media content streams 108, from time to time, include one or more of the plurality of data tables 112. The data tables 112 have the various control information that the media device 102 needs to access a particular media content event of interest in the broadcasting media content streams 108.

With the various embodiments of the fast channel change system 100, the media devices 102 are configured to communicatively couple to the data tables server 106 via a suitable broadcast communication system 110. The media devices 102 may receive one or more of the plurality of data tables 112 from the data tables server 106 (in lieu of, or in addition to, corresponding data tables being received in the media content streams 108). The received data tables 112 comprise various control information used to perform a channel change operation such that the media device 102 reconfigures itself to change to one of a new channel from a currently presenting channel or to a new media content event from a currently presenting media content event. Here, the new channel has the new media content event therein. After completion of the channel change operation, the new media content event is presentable to the user.

More particularly, the control information in the data tables 112 are used by the media device 102 to generate control instructions for operating at least one of a tuner, a demultiplexer and a decoder of the media device during a channel change operation that is initiated after the server-sourced data tables 112 have been received. These control instructions are generated by the media device 102 in response to an initiation of the channel change operation by a user of the media device 102. A channel change operation causes the media device 102 to change to one of a new channel from a currently presenting channel or a new media content event from a currently presenting media content event. In many situations, the media device must also reconfigure itself to receive a new media content stream that the new media content event is being broadcast in.

One or more of the plurality of server-sourced data tables 112 may be automatically communicated out from the data tables server 106 to the plurality of media devices 102, interchangeably referred to herein as a push mode of operation. In an example embodiment, selected ones of the plurality of server-sourced data tables 112 are pushed out to the plurality of media devices 102 from time to time (periodically) and/or when the control information in one or more of the plurality of server-sourced data tables 112 has changed, has been updated, and/or has been revised.

The pushing of one or more of the plurality of server-sourced data tables 112 to the plurality of media devices 102 may be performed for commonly used, or for more frequently used, data tables used by al of the media devices 102. Alternatively, or additionally, selected server-sourced data tables 112 that are associated with commonly used and/or more frequently used channels may be pushed out to the media devices 102 periodically and/or when such data tables 112 are changed, updated and/or revised. Data tables for less commonly used and/or less frequently used channels may be pulled by requesting media devices 102 as needed by that particular media device 102 to implement a channel change operation. Alternatively, or additionally, such less used server-sourced data tables 112 may be pushed out to the media devices 102 less frequently that the other server-sourced data tables 112.

Alternatively, or additionally, one or more of the plurality of server-sourced data tables 112 may be communicated from the fast channel change system 100 to a particular media device 102 in response to a request from the media device 102 for a particular one or more of the plurality of data tables 112 stored at the data tables server 106, interchangeably referred to herein as a pull mode of operation. The request for one or more of the server-sourced data tables 112 may be periodically requested by the media device 102 and/or may be request in response to a channel change operation.

The access to the plurality of server-sourced data tables 112 directly from the data tables server 106 is performed by embodiments of the fast channel change system 100 so that, in response to an initiation of a channel change operation, the media device 102 may complete the channel change operation in a shorter period of time (duration) than the longer period of time required for the media device 102 to receive the same (or similar) data tables 112 in the broadcasting media content streams. That is, the broadcasted data tables 112 having the control information that is provided in a broadcasting stream of a media content stream 108 will require some duration for the media device 102 to acquire from the data packets associated with the plurality of data tables. Here, embodiments of the fast channel change system 100 eliminate, or significantly reduce, the time for the media device 102 to obtain the control information from the plurality of server-sourced data tables 112 since the plurality of data tables 112 are already stored at the media device 102 and/or are directly accessible by the media device 102 from the data tables server 106.

In a hybrid embodiment of the fast channel change system 100, the plurality of server-sourced data tables 112 are directly available from the data tables server 106 and are also provided in the broadcasting media content streams 108 (the broadcasted data tables 112). The broadcasted data tables 112 can be received and optionally processed by the media device 102 after an initiation of a channel change operation, and therefore, the broadcasted data tables 112 would be received after the server-sourced data tables 112 have been received from the data tables server 106). Such an embodiment provides for redundancy in that eventually, the media device 102 will have the correct control information from the plurality of data tables 112 to effect a channel change operation. If the most current control information has already been received and/or is more quickly available from the data tables server 106, the channel change operation may be completed in a shorter channel change duration. However, if the media device 102 must acquire the control information in one or more of the plurality of later broadcasted data tables 112, such as in the event that the server-sourced data tables 112 acquired from the data tables server 106 are not the most current data tables 112, the channel change duration will not be greater than the channel change duration of a legacy media content broadcast system since the hybrid system and the legacy systems acquired the most current data tables 112 from the broadcasting media content streams 108.

Further, receiving the control information in one or more of the plurality of server-sourced data tables 112 directly from the data tables server 106, and then later receiving the same control information in corresponding broadcasted data tables 112 received in the broadcast media content stream 108 provides a process for verifying accuracy of the control information since the same control information received from the two different sources can be compared. For example, the media device 102 may begin the process of implementing a channel change operation using at least some of the control information in one or more of the plurality of server-sourced data tables 112 that have been received directly from the data tables server 106. If a problem or error occurs during the channel change operation because some of the control information in one or more of the plurality of server-sourced data tables 112 is in error and/or is no longer current, then the media device 102 can then acquire the correct control information when it is received in the corresponding one or more of the plurality of broadcasted data tables 112 being received in the broadcasting media content streams 108.

To facilitate disclosure of an exemplary embodiment of the fast channel change system 100, delivery of media content events to the media device 102 are briefly described. A media content event receive system 116 receives media content, in the form of a plurality of media content events, from a plurality of local program providers or other content providers (not shown). The received media content events may include, but are not limited to, a television program, a newscast, a broadcast sports event, a movie, or the like.

The media content event receive system 116 processes the received media content events as necessary to prepare them for transmission to the plurality of media devices 102. For example, commercials or the like may be incorporated with a particular media content event. Alternatively, or additionally, the media content events may be associated with identifiers, such as channel number and/or station call signs. The plurality of media content events are then provided to the transport channel generation system 118 via a suitable connection 120.

The processed media content events are incorporated into a designated one of a plurality of transport streams 122 (corresponding to the media content streams 108). Depending upon the nature of the particular broadcast communication system 110 that is being used, a series of media content events associated with a common channel (but having different broadcast times) may be added into a particular transport stream 122 at an appropriate time (that corresponds to its scheduled broadcast times). The transport streams 122 are received at the transport channel communication system 124, and are then communicated out onto the broadcast communication system 110 so as to be received as the media content streams 108 at the media devices 102.

A variety of types of communication systems may be used for the broadcast communication system 110 to communicate the media content streams 108 to the media devices 102. The broadcast communication system 110 may employ a satellite system 126 wherein an uplink signal 128 is communicated from the transport channel communication system 124 to a ground antenna 130. The uplink signal 128 (with one or more media content streams 108 therein) is communicated from the ground antenna 130 up to one or more satellites 132. Each of the exemplary satellites 132 broadcast a wireless satellite signal 134 down to a receiver antenna 136 that is coupled to the media device 102. The media device 102 receives the media content streams 108 from the receiver antenna 136. A tuner (not shown) in the media device 102 is operated to tune (receive) a particular one of the received media content streams having the media content event of interest that has been selected by the user for presentation on the presentation system 138.

Alternatively, or additionally, the broadcast communication system 110 may employ an over the air (OTA) system 140 wherein a wireless signal 142 is communicated out to the plurality of media devices 102. The wireless signal 142 is received by the receiver antenna 136. In some applications, there may be multiple media content broadcast facilities 104 each broadcasting one or more different wireless signals 142. The media device 102 then receives the media content stream 108 from the receiver antenna 136.

Alternatively, or additionally, the broadcast communication system 110 may employ a cable system 144 wherein a wire-based signal is communicated using a suitable cable 146 or the like that is communicatively coupled to the media device 102. Non-limiting examples of the cable 146 include a fiber optic cable, a coaxial cable, and a telephone line. The media device 102 then receives the media content streams 108 via the cable 146.

The media content streams 108 may also be received by the media device 102 in other manners. In an exemplary embodiment, the media content provider is communicatively coupled to the media device 102 via an exemplary communication system 114. The media content streams 108 may then be received at the media device 102 via a communication link 148 that establishes connectivity of the media device 102 to the media content broadcast facility 104. Alternatively, or additionally, the media device may be communicatively coupled to another remote site (not shown), such as an Internet web site or the like, that is providing a broadcast of a media content event in media content stream 108.

Regardless of the broadcast source of a particular media content event, the media device 102 requires various control information to properly access a particular media content stream 108 having the media content event of interest, and to properly access and process the video and audio data (and other associated information) that is used to generate the media content event that is streamed to the media presentation system 138 for presentation to the user. As noted herein, the required control information is aggregated into one or more of the plurality of data tables 112. The control information is defined by the data tables generation system 150 that receives information about each of the media content events from the media content event receive system 116, via connection 152. For example, control information associated with the channel that a particular media content event of interest is being broadcast on is required by the media devices 102 so that they may tune to the proper frequency/channel. The control information may also indicate the data format of the media content event (which may be different from one media content provider to another media content provider, and/or which may be different from one media content event to another media content event). The control information associated with each of the various channels may be received from the media content event receive system 116 and used by the data tables generation system 150 to generate some of the required control information that is incorporated into the various data tables 112.

Other control information may be required to populate the plurality of data tables 112. For example, the transport channel generation system 118 may provide the various packet identification information to the data tables generation system 150, via connection 154. The packet identification information and other included information identifies the particular media content event that the encapsulated content portion is for, and defines where the content portion is to be located in the media content event. This packet information associated with the data packets may be received from the transport channel generation system 118 and used by the data tables generation system 150 to generate some of the required control information that is incorporated into the various data tables 112.

Additionally, or alternatively, the transport channel generation system 118 may provide information, such as a broadcast frequency or the like, that indicates the particular transport channel that a particular media content event is to be communicated in over the broadcast communication system 110. That is, information identifying which particular media content stream 108 that a particular media content event is in is communicated from the transport channel generation system 118 to the data tables generation system 150. This control information is used by the data tables generation system 150 to generate some of the required control information that is incorporated into the various data tables 112

It is appreciated that the transport channel generation system 118 and/or the transport channel communication system 124 may, from time to time, change which media content stream is being used to communicate a particular media content event. Communication of a particular media content event may be changed from one media content stream 108 to a different media content stream 108 based on changes in available bandwidth over portions of the broadcast communication system 110. Alternatively, or additionally, a failure of one or more components in the broadcast communication system 110 may require that a particular media content event be subsequently changed from one media content stream 108 to a different media content stream 108 so that the media content event can continue to be streamed out to the plurality of media devices 102. As such information may change from time to time, one skilled in the art appreciates that the control information of the plurality of data tables 112 must be updated, modified, or otherwise changed when such changes occur. Otherwise, the control information in the data tables 112 will not be current and/or accurate, and the media devices 102 will not be able to complete a channel change operation.

Other types of control information may be provided to the data tables generation system 150 from other sources (not shown). For example, a particular media content event may be a premium or pay-for-view type of media content event that is encrypted so as to prevent access by unauthorized media devices 102. Access authorization for a particular media device 102 may be provided to the data tables generation system 150 for inclusion into the control information used to generate the plurality of data tables 112. Thus, the control information in a received one of the plurality of data tables 112 may include authorization information that is used to permit a particular media device 102 to access that media content event from one of the broadcasting media content streams 108.

As another non-limiting example, the control information may include any encryption/decryption control information that is used to encrypt a media content event, and/or encrypt the associated media content stream 108. The receiving media device 102 would need the decryption information to decrypt a received encrypted media content event and/or encrypted media content stream 108. The encryption/decryption information may periodically change to ensure security. Accordingly, one skilled in the art appreciates that the encryption/decryption control information included in one or more of the plurality of data tables 112 must be updated, modified, or otherwise changed so that the media device has access to the most current encryption/decryption information.

The data tables generation system 150 receives information that is used to define the control information that is needed by the plurality of media devices 102. The generated plurality of data tables 112 are maintained by the data tables generation system 150 so that the most current version of the data tables 112 are available to the plurality of media devices 102. These generated plurality of data tables 112 are then stored at the data tables generation system 150 (or are stored in a suitable memory medium controlled by and accessible by the data tables generation system 150). From time to time, and/or when the plurality of data tables 112 are updated, modified, or otherwise changed, the data tables generation system 150 communicates, via connection 156, the current one or more of the plurality of data tables 112 to the transport channel generation system 118. The transport channel generation system 118 may then incorporate the current plurality of data tables 112 into one or more of the media content streams 108 (interchangeably referred to herein as the broadcasted data tables 112). The broadcasted data tables 112 are then eventually received by the plurality of media devices 102.

Additionally, in the various embodiments of the fast channel change system 100, the current plurality of data tables 112 are communicated from the data tables generation system 150 to the data tables server 106, via connection 160. The plurality of current data tables 112 are then stored at the data tables server 106 in a suitable memory medium. Alternatively, the plurality of current data tables 112 may be stored in a suitable memory medium controlled by and accessible by the data tables server 106, such as a memory medium that the data tables generation system 150 is using to store the plurality of data tables 112 that it is generating and maintaining.

The data tables server 106 is communicatively coupled to the communication system 114, via connection 160. Accordingly, the plurality of media devices 102 are communicatively coupled to the data tables server 106 (via connections 148, 160). The data tables server 106 may then provide access to the plurality of data tables 112 (interchangeably referred to herein as the server-sourced data tables 112) to each one of the plurality of media devices 102. It is appreciated by one skilled in the arts that one or more data tables servers 106 may be at any suitable location remote from the media content broadcast facility 104. Alternatively, or additionally, the data tables server 106 may reside at the media content broadcast facility 104 and/or may be incorporated into one or more of the components of the media content broadcast facility 104, such as, but not limited to, the data tables generation system 150 itself.

The communication system 114 is illustrated as a generic communication system. In one embodiment, the communication system 114 comprises a cellular telephone system, such as a radio frequency (RF) wireless system. Accordingly, the media device 102 includes a suitable transceiver. Alternatively, the communication system 114 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the media device 102 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the media device 102 may be configured to communicate over combination systems having a plurality of segments which employ different formats for each segment that employ different technologies on each segment.

Figure 2:
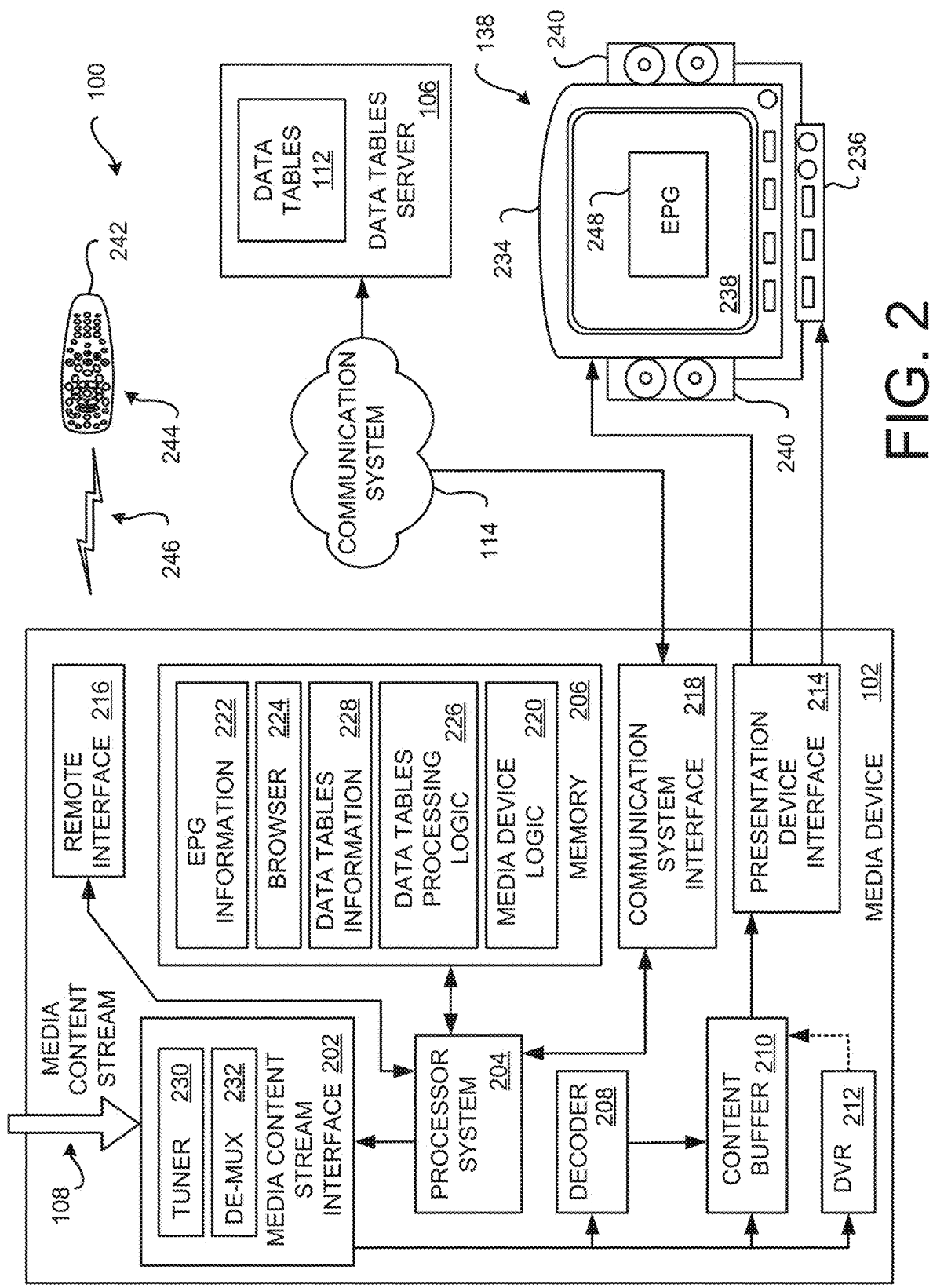
FIG. 2 is a block diagram of the fast channel change system that is operable to control a media device.

FIG. 2 is a block diagram of the fast channel change system 100 that is operable to control a media device 102, such as, but not limited to, a set top box (STB). The non-limiting exemplary media device 102 comprises a media content stream interface 202, a processor system 204, a memory 206, a decoder 208, a content buffer 210, an optional digital video recorder (DVR) 212, a presentation device interface 214, a remote interface 216, and a communication system interface 218. The memory 206 comprises portions for storing the media device logic 220, the electronic program guide (EPG) information 222, an optional browser 224, data tables processing logic 226 and the data tables information 228. In some embodiments, the media device logic 220 and the data tables processing logic 226 may be integrated together, and/or may be integrated with other logic. The media content stream interface 202, in some embodiments, comprises at least one tuner 230 and an associated demultiplexer 232. The processor system 204 is communicatively coupled to at least the memory 206, and is controllably coupled to the content buffer 210, the tuner 230, the demultiplexer 232, and the decoder 208. In other embodiments, some or all of these memory and other data manipulation functions may be provided by using a remote server or other electronic devices suitably connected via the Internet or otherwise to a client device. The media content stream interface 202 comprises at least one tuner 230 and an associated demultiplexer (de-mux) 232. The memory 206 may be any suitable memory medium, and or may comprise a plurality of different memory mediums. Further, one or more of the memory mediums may be located external to the media device 102. Other media devices 102 may include some, or may omit some, of the above-described media processing components. Further, additional components not described herein may be included in alternative embodiments.

The exemplary media device 102 is communicatively coupled to the media presentation system 138 that includes a visual display device 234, such as a television (hereafter, generically a TV), and an audio presentation device 236, such as a surround sound receiver controlling an audio reproduction device. The video portion of a currently presenting media content event is presented to a user on a display 238 of the visual presentation device 234. The audio portion of the media content event is reproduced as audible sounds by one or more speakers 240 of the audio presentation device 236. Other types of output devices may also be coupled to the media device 102, including those providing any sort of stimuli sensible by a human being, such as temperature, vibration and the like. In some embodiments, one or more of the components of the media device 102 and/or the media presentation system 138 may be integrated into a single electronic device.

The exemplary media device 102 is configured to receive commands from a user via a remote control 242. The remote control 242 includes one or more controllers 244 disposed on the surface of the remote control 242. The user, by actuating one or more of the controllers 244, causes the remote control 242 to generate and transmit commands, via a wireless signal 246, to the media device 102. Preferably, each individual one of the controllers 244 has a specific predefined function that causes a specific operation by the media device 102 and/or by components of the media presentation system 138. The commands communicated from the remote control 242 then control the media device 102 and/or control components of the media presentation system 138. Example controllers 244 may include a channel increment up controller (that increments the current channel number to the next higher available channel number), a channel decrement controller (that decrements the current channel number to the next lower available channel number), or a plurality of numeric controllers (that enable the user to specify a particular channel number of interest that the media device 102 will change to during the channel change operation). The wireless signal 246 may be an infrared (IR) signal or a radio frequency (RF) signal that is detectable by the remote interface 216.

Embodiments of the fast channel change system 100 are configured to access one or more of the data tables 112 from the data tables server 106 so that the channel change duration required for completion of a channel change operation is reduced. The channel process may be initiated by the user viewing an EPG 248 that is being presented on the display 238. The channel change duration may be less that that of legacy systems since some or all of the control information of the prior received server-sourced data tables 112 do not need to be acquired from the broadcasting media content streams 108. The channel change operation may initiated when the user selects for presentation one of the media content events indicated on the EPG 248, selects a channel shown on the EPG 248 that is different from the channel currently presenting the current media content event, or operates their remote control 242 to implement a channel change.

The functionality of the media device 102, here a set top box, is now broadly described. In a satellite broadcast system environment, the satellites 132 (FIG. 1) broadcasts the plurality of media content streams 104 down to the plurality of media devices 102. Multiple media content streams 108 may be transported together in one or more transport channels. The transport channels with the media content streams 104 are communicated to the media device 102 from a media system sourced from the media content broadcast facility 104. The media device 102 is configured to receive one or more broadcasted satellite signals detected by the receiver antenna 136. Non-limiting examples of other media content broadcasting systems that broadcast a plurality of media content streams 108 include a cable system 144, an over the air system 140, and the Internet.

The one or more media content streams 104 are received by the media content stream interface 202. Accordingly, when a channel change operation is initiated, the media device must perform a plurality of operations on its various components to present the new media content event that has been requested by the user of the media device 102. These plurality of different component operations are interchangeably referred to herein as portions of the channel change operation.

For example, a first portion of the channel change operation would be to operate one of the tuners 230 in the media content stream interface 202 to selectively tune to one of the media content streams 108 having the new media content event that is to be presented after a completion of the channel change operation. The tuner is reconfigured to operate in accordance with tuner control instructions received from the processor system 204. In practice, when a channel change operation is initiated to change from the current channel (or current media content event) to a new channel (or to a new media content event on a new channel), the tuner 230 must be reconfigured to receive the particular media content stream 108 that is transporting the new channel. (However, one skilled in the arts appreciates that in some instances, the new channel and the current channel may both be transported in the same media content stream 108, and therefore, the tuner 230 would not necessarily need to be reconfigured.) The tuner control instructions are generated by the processor system 204 based at least in part on various tuner control information (parameters) retrieved from one or more of the previously acquired server-sourced data tables 112 that have been stored in the data tables information 228.

Once the tuner operation portion of the channel change operation has been completed (if necessary), the demultiplexer 232 is reconfigured during a next portion of the channel change operation. Here, the media content stream 108 having the new media content event of interest therein (or the media content event in the newly specified channel) is communicated from the tuner 230 to the demultiplexer 232. In many media content broadcast systems, a plurality of different media content events have been packetized and multiplexed together into a common media content stream 108. Based on demultiplexer control instructions received from the processor system 204, the demultiplexer 232 selectively retrieves the individual data packets having the new media content event of interest. Other data packets associated with other media content events (or channels) are not selected by the demultiplexer 232. The demultiplexer control instructions are generated by the processor system 204 based at least in part on various demultiplexer control information (parameters) retrieved from one or more of the previously acquired server-sourced data tables 112 that have been stored in the data tables information 228.

The decoder is reconfigured during another portion of the channel change operation. The decoder 208 receives the data from the selected data packets from the demultiplexer 232. Based on decoder control instructions received from the processor system 204, the decoder 208 assembles the received data into a stream of media content (video data and audio data) corresponding to the new media content event of interest. Different decoder information (parameters) is used to decode the media content data depending upon the particular format of the media content data. Further, different decoder information (parameters) may be required to construct the stream of media content that is useable by the components of the media presentation system 138. The decoder control instructions are generated by the processor system 204 based at least in part on various decoder control information (parameters) retrieved from one or more of the previously acquired server-sourced data tables 112 that have been stored in the data tables information 228

Once the media content event of interest has been assembled into a stream of video and/or audio information which may be stored by the content buffer 210, the media content can be streamed out to components of the media presentation system 138, such as the visual display device 238 and/or the audio presentation device 236, via the presentation device interface 214. Alternatively, or additionally, the parsed out media content may be saved into the DVR 212 for later presentation. The DVR 212 may be directly provided in, locally connected to, or remotely connected to, the media device 102. In alternative embodiments, the media content streams 108 may stored for later decompression, processing and/or decryption.

From time to time, information populating the EPG information 222 portion of the memory 206 is communicated to the media device 102, via one or more of the media content streams 108 or via another suitable media. The EPG information 222 stores the information pertaining to the scheduled programming for the currently broadcasting media content events and for media content events that are scheduled for future broadcast. The information may include, but is not limited to, a scheduled broadcast start and/or end time, a program channel identifier, and other descriptive information. The media content event's descriptive information may include the title of the program, names of performers or actors, date of creation, and a summary describing the nature of the program. Any suitable information may be included in the program's supplemental information. Upon receipt of a command from the user requesting presentation of an EPG display, the EPG information 222 is retrieved, formatted, and then presented on the display 238 as an EPG 248.

The processes performed by the media device 102 relating to the processing of the received media content streams 108 and communication of a presentable media content event to the components of the media presentation system 138 are generally implemented by the processor system 204 while executing the media device logic 220 in concert with the data tables processing logic 226. Thus, the media device 102 may perform a variety of functions related to the processing and presentation of one or more media content events received in the media content streams 108.

The tuner control instructions generated using the tuner control information (parameters), the demultiplexer control instructions generated using the demultiplexer control information (parameters), and/or the decoder control instructions generated using the decoder control information (parameters), are generated by the processor system 204 that has retrieved the various data tables 112 from the data tables information 228 stored in the memory 206. That is, the information (parameters) of the stored data tables 112 is used by the processor system 204 to control the tuner 230 (using the tuner control instructions), the demultiplexer 232 (using the demultiplexer control instructions) and/or the decoder 208 (using the decoder control instructions) during a channel change operation.

Redundancy of the control information is provided by embodiments of the hybrid system. Here, if a portion of the channel change operation cannot be completed based on the stored server-sourced data tables 112, then control information can be accessed from a later received corresponding one of the broadcasted data tables 112. For example, first control instructions may be generated based on a first part of the server-sourced data tables 112, wherein the first control instructions are used by the media device 102 to perform a first portion of the channel change operation (such as reconfiguring the tuner 230). Thus, the first portion of the channel change operation of reconfiguring the tuner 230 is performed using the generated tuner control instructions. Then, second control instructions may be generated based on a second part of the server-sourced data tables 112, wherein the second control instructions are used by the media device 102 to perform a second portion of the channel change operation. For example, after completion of the first portion of the channel change operation that reconfigures the tuner 230, the demultiplexer control instructions may be generated from a second part of the server-sourced data tables 112 (wherein the generated demultiplexer control instructions reconfigures operation of the demultiplexer 232 so that the data packets associated with the new media content event are accessed). In some instances, the packet data identification information may have been changed after the server-sourced data tables 112 were received from the data tables server 106. Accordingly, when the media device 102 is attempting to perform this second portion of the channel change operation (reconfiguring the demultiplexer 232) using the demultiplexer control instructions generated from the server-sourced data tables 112, this second portion of the channel change operation cannot be completed (since the packet data identification information is no longer current). In response to a failure to complete this second portion of the channel change operation, alternative demultiplexer control instructions are generated by the media device 102 based on the corresponding broadcasted data tables 112 that have the current packet data identifiers. The second portion of the channel change operation to reconfigure the demultiplexer 232 can then be completed based on the current packet data identifiers obtained from the later received broadcasted data tables 112.

Example types of data tables 112 are now broadly described. In a non-limiting example satellite system 126, three exemplary data tables 112 that are used for a channel change operation include a Program Association Table (PAT), a Program Map Table (PMT), and a Conditional Access Table (CAT). These non-limiting exemplary tables are described in various well-known standards, such as the International Organization for Standardization (ISO) International Electrotechnical Commission (IEC) 13818-1 specification. The tables may optionally be referred to as "sections" in the various standards that define the information (parameters) of the data tables 112.

The PAT provides a high-level view of what media content events are on the current satellite transponder (frequency) and what the corresponding PMT is for each media content event. An exemplary PAT includes at least the information shown below:

```
program_association_section( ) {
    table_id 8 uimsbf
    section_syntax_indicator 1 bslbf
    '0' 1 bslbf
    reserved 2 bslbf
    section_length 12 uimsbf
    transport_stream_id 16 uimsbf
    reserved 2 bslbf
    version_number 5 uimsbf
    current_next_indicator 1 bslbf
    section_number 8 uimsbf
    last_section_number 8 uimsbf
    for (i = 0; i <N; i++) {
        program_number 16 uimsbf
        reserved 3 bslbf
        if (program_number = = '0') {
            network_PID 13 uimsbf
        }
        else {
            program_map_PID 13 uimsbf
        }
    }
    CRC_32 32 rpchof
}
```

One skilled in the arts understands the nature of the above-described exemplary PAT, the particulars of the control information (parameters) contained therein, and what control information (parameters) are needed to control the tuner 230, the demultiplexer 232, and/or the decoder 208.

The PMT provides a list of all streams for a given media content event. This includes all audio and video streams. Typically streaming media content event will include a single video stream and one or more audio streams (i.e., English and Spanish, MPEG audio or Dolby Digital audio, etc). The streaming media content event may optionally contain at least one CA_descriptor( ) which will have the ECM information (see below). The PMT provides a list of all streams for a given media content event. The PMT includes information corresponding to all audio and video streams. Typically the PMT will include information corresponding to a single video stream and one or more audio streams (i.e. English and Spanish, MPEG audio or Dolby Digital audio, etc). The PMT may also can contain CA_descriptor( ) which will have the entitlement control (ECM) information. An exemplary PMT includes at least the information shown below:

```
TS_program_map_section( ) {
    table_id 8 uimsbf
    section_syntax_indicator 1 bslbf
    '0' 1 bslbf
    reserved 2 bslbf
    section_length 12 uimsbf
    program_number 16 uimsbf
    reserved 2 bslbf
    version_number 5 uimsbf
    current_next_indicator 1 bslbf
    section_number 8 uimsbf
    last_section_number 8 uimsbf
    reserved 3 bslbf
    PCR_PID 13 uimsbf
    reserved 4 bslbf
    program_info_length 12 uimsbf
    for (i = 0; i < N; i++) {
        descriptor( )
    }
    for (i = 0; i < N1; i++) {
        stream_type 8 uimsbf
        reserved 3 bslbf
        elementary_PID 13 uimsbf
        reserved 4 bslbf
        ES_info_length 12 uimsbf
        for (i = 0; i < N2; i++) {
            descriptor( )
        }
    }
    CRC_32 32 rpchof
}
```

One skilled in the arts understands the nature of the above-described exemplary PAT, the particulars of the control information (parameters) contained therein, and what control information (parameters) are needed to control the tuner 230, the demultiplexer 232, and/or the decoder 208.

The CAT provides conditional access information, particularly EMM (see below. An exemplary CAT included at least the information shown below:

```
CA_section( ) {
    table_id 8 uimsbf
    section_syntax_indicator 1 bslbf
    '0' 1 bslbf
    reserved 2 bslbf
    section_length 12 uimsbf
    reserved 18 bslbf
    version_number 5 uimsbf
    current_next_indicator 1 bslbf
    section_number 8 uimsbf
    last_section_number 8 uimsbf
    for (i = 0; i < N; i++) {
        descriptor( )
    }
    CRC_32 32 rpchof
}
CA_descriptor( ) {
    descriptor_tag 8 uimsbf
    descriptor_length 8 uimsbf
    CA_system_ID 16 uimsbf
    reserved 3 bslbf
    CA_PID 13 uimsbf
    for (i = 0; i < N; i++) {
        private_data_byte 8 uimsbf
    }
}
```

One skilled in the arts understands the nature of the above-described exemplary CAT, the particulars of the control information (parameters) contained therein, and what control information (parameters) are needed to control the tuner 230, the demultiplexer 232, and/or the decoder 208.

In some embodiments, if the CA_descriptor( ) is in the CAT, then it specifies EMM (Entitlement Management Message) information. If the CA_descriptor( ) is in the TS_program_map_section( ), then it specifies ECM (Entitlement Control Message) information. Both EMM and ECM are unique to the particular broadcast communication system 110 employed to communicate broadcasted media content streams 108, and therefore, are not defined in standards and/or depend on the system. Such optional ECM/EMM contain control information (parameters) about subscriptions and the information to decrypt any scrambled (encrypted) media content streams 108.

Another exemplary data table that may be included in the data tables 112 obtained from the data tables server 106 and/or the media content streams 108 may be a Service Description Table (SDT). The SDT is defined in European Standard (Telecommunication Series) or the Digital Video Broadcasting (DVB) Specification for Service Information (SI), commonly referred to in the arts as the ETSI EN 300 468 specification. The SDT provides a list of all services for both the current satellite transponder (frequency) and for all other satellite transponders. The exemplary SDT includes at least the information shown below:

```
service_description_section( ){
    table_id 8 uimsbf
    section_syntax_indicator 1 bslbf
    reserved_future_use 1 bslbf
    reserved 2 bslbf
    section_length 12 uimsbf
    transport_stream_id 16 uimsbf
    reserved 2 bslbf
    version_number 5 uimsbf
    current_next_indicator 1 bslbf
    section_number 8 uimsbf
    last_section_number 8 uimsbf
    original_network_id 16 uimsbf
    reserved_future_use 8 bslbf
    for (i = 0;i<N;i++){
        service_id 16 uimsbf
        reserved_future_use 6 bslbf
        EIT_schedule_flag 1 bslbf
        EIT_present_following_flag 1 bslbf
        running_status 3 uimsbf
        free_CA_mode 1 bslbf
        descriptors_loop_length 12 uimsbf
        for (j=0;j<N,j++){
            descriptor( )
        }
    }
    CRC_32 32 rpchof
}
```

One skilled in the arts understands the nature of the above-described exemplary SDT, the particulars of the control information (parameters) contained therein, and what control information (parameters) are needed to control the tuner 230, the demultiplexer 232, and/or the decoder 208.

One skilled in the art appreciates that the above-described PAT/PMT/CAT/SDT data tables 112 are merely example data tables 112. One or more of these example PAT/PMT/CAT/SDT data tables 112 may be communicated to the plurality of media devices 102 from the data tables server 106. Other forms of the above-described data tables 112, and/or other data tables 112, may be employed by alternative embodiments. Any suitable information (parameters)

required to implement a channel change operation that is otherwise included in the broadcasting media content streams 108 may be included in, or may be incorporated with, such data tables 112.

In some embodiments, the control data in the received server-sourced data tables 112 and/or the broadcasted data tables 112 are used to construct a relational database that stores individual control data elements (parameters). Thus, when one or more newly received server-sourced data tables 112 and/or broadcasted data tables 112 are processed by the data tables processing logic 226, the most current control data elements (parameters) are saved into the database (generically illustrated as residing in the data tables information 228). Any suitable relational database system now known or later developed may be used by the various embodiments.

In a non-limiting hybrid system, the data tables processing logic 226 may be optionally configured to compare the stored server-sourced data tables 112 with later received broadcasted data tables 112. Alternatively, or additionally, the data tables processing logic 226 may be optionally configured to compare the control data elements (parameters) stored server-sourced data tables 112 with later received corresponding control data elements (parameters) received in the broadcasted data tables 112. In the event that the information in one or more of the broadcasted data tables 112 is more current (more accurate) than the corresponding data in the server-sourced data tables 112, then an example embodiment replaces the server-sourced data table(s) 112 with the corresponding more current broadcasted data table(s) 112. The most current data tables 112 and/or the most current control data elements (parameters) are then saved into the data tables information 228 by replacing the older, out-of-date data tables 112 and/or selected control data elements (parameters).

For example, but not limited to, a particular channel and/or media content stream 108 may have been previously communicated (broadcast) at a particular frequency. The frequency information is stored into the data tables information 228 in a data table 112 (or as a particular control data element/parameter in a database). At some later point in time, the frequency used to broadcast that particular channel and/or media content stream 108 may be changed. Accordingly, in the event that a channel change operation is initiated so that that media device 102 may now process the content of that particular channel and/or media content stream 108, the tuner control instructions provided by the processor system 204 to the tuner 230 would not have the correct new frequency information, and there, the media device 102 could not tune itself to receive the new particular channel and/or media content stream 108.

In practice, the media device would have previously received an update to the associated data table 112 from the data table server 106. Accordingly, the new frequency information would then be available to the processor system 204 so that the tuner 230 could be operated to tune to the correct new frequency. The channel change operation could then be completed.

However, if the new frequency information had not yet been received, the channel change operation would become delayed until the corresponding broadcasted data table 112 (with the new frequency information) has been received in one of the media content streams 108. Once the broadcasted data table 112 has been processed to retrieve the new frequency information, the channel change operation could then resume.

Additionally, some embodiments are configured to store the broadcasted data table 112 (and/or the new frequency information) into the data tables information 228 for later use by the media device 102. Further, in view that the previously out of date frequency information was not useable, embodiments may be configured to replace all of the control data elements (parameters) in the previously received data table 112 with the information in the newly received broadcasted data table 112 based on an assumption that some or all of the information in the earlier received data table 112 was no longer accurate and/or current.

It should be emphasized that the above-described embodiments of the fast channel change system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method to perform a channel change operation at a media device, the method comprising:
   receiving a first data table at the media device from a data table server via a communication system that communicatively couples the media device with the data table server,
      wherein the first data table comprises first control information used to perform the channel change operation such that the media device reconfigures itself to change to a new channel from a currently presenting channel or to a new media content event from a currently presenting media content event,
   receiving a plurality of broadcasting media content streams at the media device,
      wherein the plurality of broadcasting media content streams are received at the media device after the first data table has been received from the data table server, and
      wherein one of the received broadcasting media content streams is providing the currently presenting media content event that is currently being presented to a user;
   initiating a channel change operation in response to a received user command,
      wherein the channel change operation is operable to cause the media device to change from the currently presenting channel to the new channel or to change from the currently presenting media content event to the new media content event,
      wherein the new channel is associated with the new media content event, and
      wherein the user command to initiate the channel change operation is received after the first data table has been received from the data table server;
   operating at least one of a tuner, a demultiplexer, and a decoder of the media device using control instructions that are generated by the media device in response to the initiation of the channel change operation,
      wherein the generated control instructions are based on the first control information of the first data table that was received from the data table server;
   presenting the new media content event to the user after a completion of the channel change operation; and
   receiving a second data table after initiation of the channel change operation, wherein the second data table is broadcast to the media device in one of the received broadcasting media content streams that has the new media content event, and wherein the second data table comprises second control information that corresponds to at least some of the first control information used to perform the channel change operation.

2. The method of claim 1, further comprising:
storing the first data table received from the data table server in a memory medium of the media device.

3. The method of claim 1, wherein operating at least one of the tuner, the demultiplexer, and/or the decoder of the media device using the control instructions that are generated by the media device in response to the initiation of the channel change operation comprises:

generating first control instructions based on a first part of the first control information, wherein the first control instructions are used by the media device to perform a first portion of the channel change operation;

performing the first portion of the channel change operation using the first control instructions;

generating second control instructions based on a second part of the first control information, wherein the second control instructions are used by the media device to perform a second portion of the channel change operation after completion of the first portion of the channel change operation;

attempting to perform the second portion of the channel change operation based on the second control instructions, wherein the second portion of the channel change operation cannot be completed based on the second control instructions;

generating alternative second control instructions based on a second part of the second control information, wherein the second part of the second control information corresponds to the second part of the first control information; and performing the second portion of the channel change operation using the alternative second control instructions that are generated from the second part of the second control information.

4. The method of claim 1, wherein operating at least one of the tuner, the demultiplexer, and/or the decoder of the media device using the control instructions that are generated by the media device in response to the initiation of the channel change operation comprises:

generating tuner control instructions based on a first part of the first control information, wherein the tuner control instructions cause the tuner to change from a first one of the plurality of broadcasting media content streams having the currently presenting channel to a second one of the plurality of broadcasting media content streams with the new channel such that the demultiplexer receives media content having the new media content therein.

5. The method of claim 1, wherein operating at least one of the tuner, the demultiplexer, and/or the decoder of the media device using the control instructions that are generated by the media device in response to the initiation of the channel change operation comprises:

generating demultiplexer control instructions based on the first control information, wherein the demultiplexer control instructions cause the demultiplexer to access data from received data packets having portions of the new media content event therein.

6. The method of claim 5, further comprising:
attempting to perform a demultiplexer portion of the channel change operation based on the demultiplexer control instructions;

generating alternative demultiplexer control instructions based on the second control information, wherein the alternative demultiplexer control instructions are generated from the second control information and correspond to the demultiplexer control instructions that were generated from the first control information; and performing the demultiplexer portion of the channel change operation using the alternative demultiplexer control instructions.

7. The method of claim 1, wherein operating at least one of the tuner, the demultiplexer, and/or the decoder of the media device using the control instructions that are generated by the media device in response to the initiation of the channel change operation comprises:

generating decoder control instructions based on the first control information, wherein the decoder control instructions are used to process media content event data.

8. The method of claim 7, further comprising:
attempting to perform a decoder portion of the channel change operation based on the decoder control instructions;

generating alternative decoder control instructions based on the second control information, wherein the alternative decoder control instructions generated from the second control information correspond to the decoder control instructions generated from the first control information; and performing the decoder portion of the channel change operation using the alternative decoder control instructions.

9. The method of claim 1, further comprising:
generating an electronic program guide that is presented to the user, wherein the channel change operation that is initiated in response to the received user command is based on a selection of the new channel by the user via the presented electronic programming guide or a selection of the new media content event by the user via the presented electronic programming guide.

10. A media device comprising:
a communication system interface that is operable to receive a first data table at the media device from a data table server via a communication system that communicatively couples the media device with the data table server, wherein the first data table comprises first control information used to perform a channel change operation such that the media device reconfigures itself to change to a new channel from a currently presenting channel or to a new media content event from a currently presenting media content event;

a memory communicatively coupled to the communication system interface that is operable to store the first data table received from the data table server;

a tuner that is operable to receive a plurality of broadcasting media content streams, and that is further operable to select one of the plurality of broadcasting media content streams, wherein the plurality of broadcasting media content streams are received at the media device after the first data table has been received from the data table server, and wherein the selected broadcasting media content stream is providing the currently presenting media content event that is currently being presented to a user;

a demultiplexer communicatively coupled to the tuner that is operable to receive the select broadcasting media content stream from the tuner, and that is further operable to access media content information from a plurality of data packets residing in the select broadcasting media content stream;

a decoder communicatively coupled to the demultiplexer that is operable to receive the accessed media content information from the demultiplexer, and that is further operable generate a stream of media content that is streamed to a media presentation system for presentation to the user; and a processor system communicatively coupled to at least the memory and controllably coupled to the tuner, the demultiplexer, and the decoder, wherein the processor system is operable to:

initiate the channel change operation in response to a received user command, wherein the channel change operation is operable to cause the media device to change from the currently presenting channel to the new channel or to change from the currently presenting media content event to the new media content event, wherein the new channel is associated with the new media content event, and wherein the user command to initiate the channel change operation is received after the first data table has been received from the data table server;

generate control instructions that operate the tuner, the demultiplexer and the decoder, wherein the control instructions are generated by the media device in response to an initiation of the channel change operation, wherein the generated control instructions are based on the first control information of the first data table that was received from the data table server; and wherein the new media content event is presented to the user after a completion of the channel change operation, and wherein the tuner is further operable to receive a second data table after initiation of the channel change operation, wherein the second data table is broadcast to the media device in one of the received broadcasting media content streams that has the new media content event, and wherein the second data table comprises second control information that corresponds to at least some of the first control information used to perform the channel change operation.

11. The media device of claim 10, further comprising:
a remote interface that is operable to receive a wireless signal from a remote control, wherein the wireless signal includes information that identifies the new channel or the new media content event for the channel change operation.

12. The media device of claim 11, wherein information in the received wireless signal received at the remote interface from the remote control is based on a user selection of the new channel or the new media content event that is made by the user via a presented electronic program guide.

13. The media device of claim 10, wherein the processor system that is operable to control operation of the tuner, the demultiplexer, and/or the decoder using the control instructions that are generated in response to the initiation of the channel change operation is further operable to:

generate first control instructions based on a first part of the first control information, wherein the first control instructions are used by the media device to perform a first portion of the channel change operation;

perform the first portion of the channel change operation using the first control instructions;

generate second control instructions based on a second part of the first control information, wherein the second control instructions are used by the media device to perform a second portion of the channel change operation after completion of the first portion of the channel change operation;

attempt to perform the second portion of the channel change operation based on the second control instructions, wherein the second portion of the channel change operation cannot be completed based on the second control instructions;

generate alternative second control instructions based on a second part of the second control information, wherein the second part of the second control information corresponds to the second part of the first control information; and perform the second portion of the channel change operation using the alternative second control instructions that are generated from the second part of the second control information.

14. The media device of claim 10, wherein the processor system that is operable to control operation of the tuner using the control instructions that are generated in response to the initiation of the channel change operation is further operable to:

generate tuner control instructions based on a first part of the first control information, wherein the tuner control instructions cause the tuner to change from a first one of the plurality of broadcasting media content streams having the currently presenting channel to a second one of the plurality of broadcasting media content streams with the new channel such that the demultiplexer receives media content having the new media content event therein.

15. The media device of claim 10, wherein the processor system that is operable to control operation of the demultiplexer using the control instructions that are generated in response to the initiation of the channel change operation is further operable to:

generate demultiplexer control instructions based on the first control information, wherein the demultiplexer control instructions cause the demultiplexer to access data from the received data packets having portions of the new media content event therein.

16. The media device of claim 15, wherein the processor system is further operable to:

attempt to perform a demultiplexer portion of the channel change operation based on the demultiplexer control instructions;

generate alternative demultiplexer control instructions based on the second control information, wherein the alternative demultiplexer control instructions are generated from the second control information and correspond to the demultiplexer control instructions that were generated from the first control information; and perform the demultiplexer portion of the channel change operation using the alternative demultiplexer control instructions.

17. The media device of claim 10, wherein the processor system that is operable to control operation of the decoder using the control instructions that are generated in response to the initiation of the channel change operation is further operable to:

generate decoder control instructions based on the first control information, wherein the decoder control instructions are used to process media content event data.

18. The media device of claim 17, wherein the processor system is further operable to:

attempt to perform a decoder portion of the channel change operation based on the decoder control instructions;

generate alternative decoder control instructions based on the second control information, wherein the alternative decoder control instructions generated from the second control information correspond to the decoder control instructions generated from the first control information; and perform the decoder portion of the channel change operation using the alternative decoder control instructions.

\* \* \* \* \*